US008737672B1

(12) United States Patent
George

(10) Patent No.: US 8,737,672 B1
(45) Date of Patent: May 27, 2014

(54) WATER RESISTANT ALARM SYSTEM

(71) Applicant: S.J. Electro Systems, Inc., Detroit Lakes, MN (US)

(72) Inventor: Todd R. George, Detroit Lakes, MN (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 0 days.

(21) Appl. No.: 13/913,753

(22) Filed: Jun. 10, 2013

(51) Int. Cl.
*H04R 1/02* (2006.01)

(52) U.S. Cl.
USPC ............................................. 381/386

(58) Field of Classification Search
None
See application file for complete search history.

(56) References Cited

U.S. PATENT DOCUMENTS

| | | | |
|---|---|---|---|
| 6,244,904 B1 * | 6/2001 | Fabian et al. | 439/656 |
| 6,987,445 B1 * | 1/2006 | Burnett et al. | 340/387.1 |
| 7,503,422 B2 * | 3/2009 | Combest et al. | 181/150 |
| 8,369,559 B2 * | 2/2013 | Liang et al. | 381/386 |
| 2005/0174245 A1 * | 8/2005 | Delaney et al. | 340/584 |

OTHER PUBLICATIONS

Tank Alert 4X Alarm Installation Instructions from SJE Rhombus; Received and Downloaded Oct. 1, 2007.
Tank Alert 1 Alarm Installation Instructions from SJE Rhombus; Received and Downloaded Apr. 1, 2008.

* cited by examiner

*Primary Examiner* — Brian Ensey
*Assistant Examiner* — Norman Yu
(74) *Attorney, Agent, or Firm* — Michael S. Neustel

(57) ABSTRACT

A water resistant alarm system for providing an effective audible alarm in a water resistant housing. The water resistant alarm system generally includes a housing comprised of a base panel and a cover connected to the base panel, a speaker within an interior of the housing, and a sound vent within the housing that allows sound generated from the speaker to pass outwardly from the housing while preventing the entry of water into the interior of the housing. The cover is removably connected to the base panel to allow for increased access to the interior of the housing. The cover is further removably connected to the base panel in a waterproof manner without utilizing seals.

31 Claims, 14 Drawing Sheets

WATER RESISTANT ALARM SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an audible alarm and more specifically it relates to a water resistant alarm system for providing an effective audible alarm in a water resistant housing that provides effective access to the interior of the housing.

2. Description of the Related Art

Any discussion of the related art throughout the specification should in no way be considered as an admission that such related art is widely known or forms part of common general knowledge in the field.

Indoor and outdoor alarm systems have been in use for years. Examples of well-known alarm systems include devices that monitor liquid levels in lift pump chambers, sump pump basins, holding tanks, sewage, agricultural and other water applications. The alarm systems are in communication with a water level sensor such as a float. The alarm systems may sound an audible and/or visual alarm when a water level is low and/or high. Conventional alarm systems have a housing that protects the electronic circuitry and components within from water. However, to prevent the entry of water into the housing they are sealed with gasket materials that increase the cost of the end product, that wear out over time and that reduce the amount of sound allowed to be emitted from the housing. Furthermore, conventional housings have covers that are pivotally connected and typically are not removable thereby restricting access space for installing wires to the interior circuitry of the alarm system or making repairs to the same. For conventional housings that have removable covers, the sidewalls of the base panel extend outwardly the same distance as the floor making it difficult to work on.

Because of the inherent problems with the related art, there is a need for a new and improved water resistant alarm system for providing an effective audible alarm in a water resistant housing.

BRIEF SUMMARY OF THE INVENTION

The invention generally relates to an audible alarm which includes a housing comprised of a base panel and a cover connected to the base panel, a speaker within an interior of the housing, and a sound vent within the housing that allows sound generated from the speaker to pass outwardly from the housing while preventing the entry of water into the interior of the housing. The cover is removably connected to the base panel in such a way as to allow for increased access to the interior of the housing. The cover is further removably connected to the base panel in a waterproof manner without utilizing seals.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
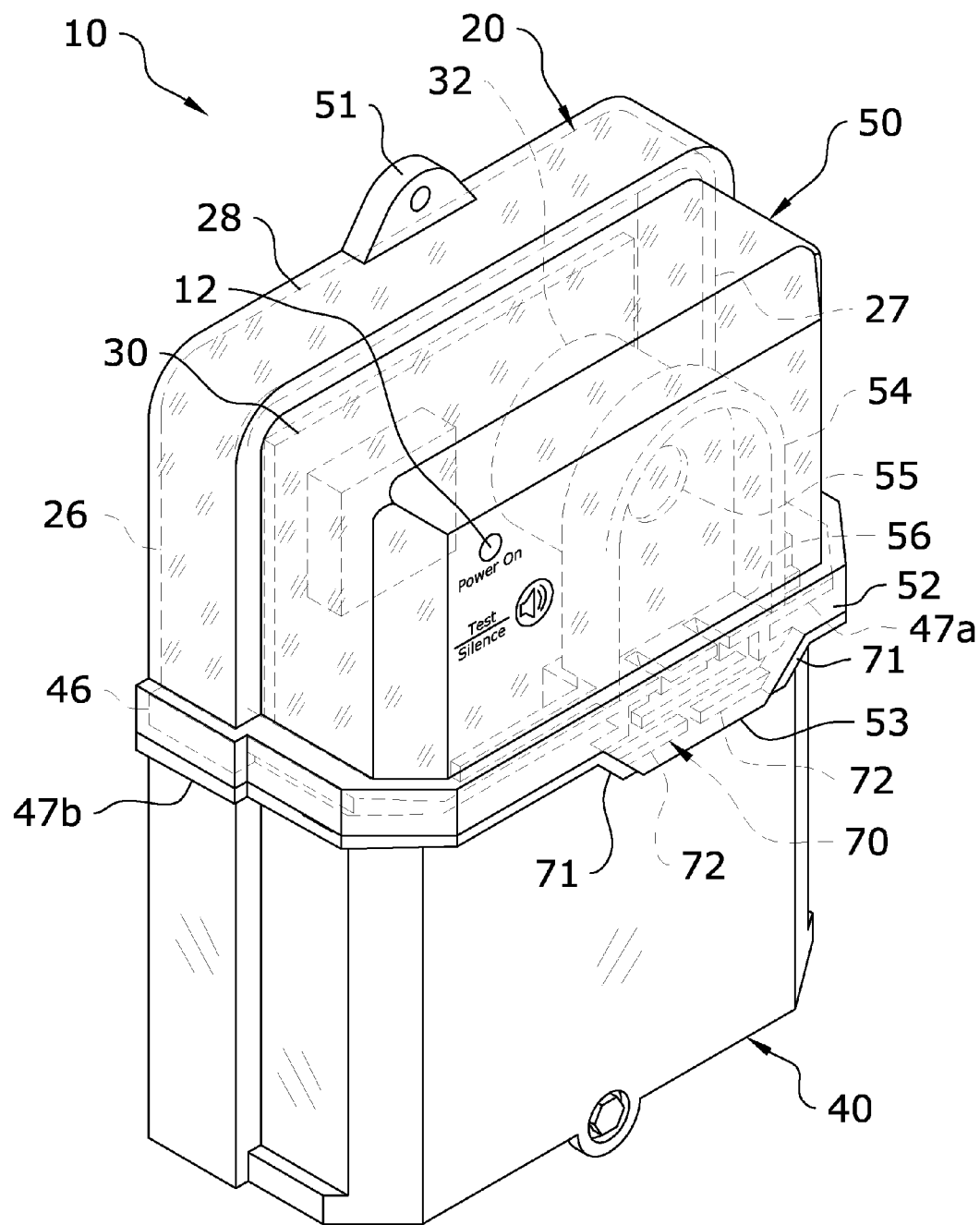
FIG. 1 is an upper perspective view of the present invention.

A. Overview.

Turning now descriptively to the drawings, in which similar reference characters denote similar elements throughout the several views, FIGS. 1 through 12 illustrate a water resistant alarm system 10, which comprises a housing comprised of a base panel 20 and a cover connected to the base panel 20, a speaker 32 within an interior of the housing, and a sound vent 70 within the housing that allows sound generated from the speaker 32 to pass outwardly from the housing while preventing the entry of water into the interior of the housing. The cover is removably connected to the base panel 20 to allow for increased access to the interior of the housing. The cover is further removably connected to the base panel 20 in a waterproof manner without utilizing seals.

B. Housing.

FIGS. 1 through 7 illustrate the housing that forms an interior for protecting electrical components (e.g. control unit 14, circuit boards 30, speaker 32, connectors 34, light etc.). The housing is water resistant and preferably waterproof without using a seal (e.g. gasket) to prevent the entry of water into the interior of the housing and thereby protecting the electrical components from water damage. The configuration of the housing is such that no seal is required or used since seals increase the expense of manufacturing the end product and can become damaged over time. The housing may have various shapes such as rectangular or square. The housing is preferably constructed of water impermeable materials such as plastic or metal.

Figure 7:
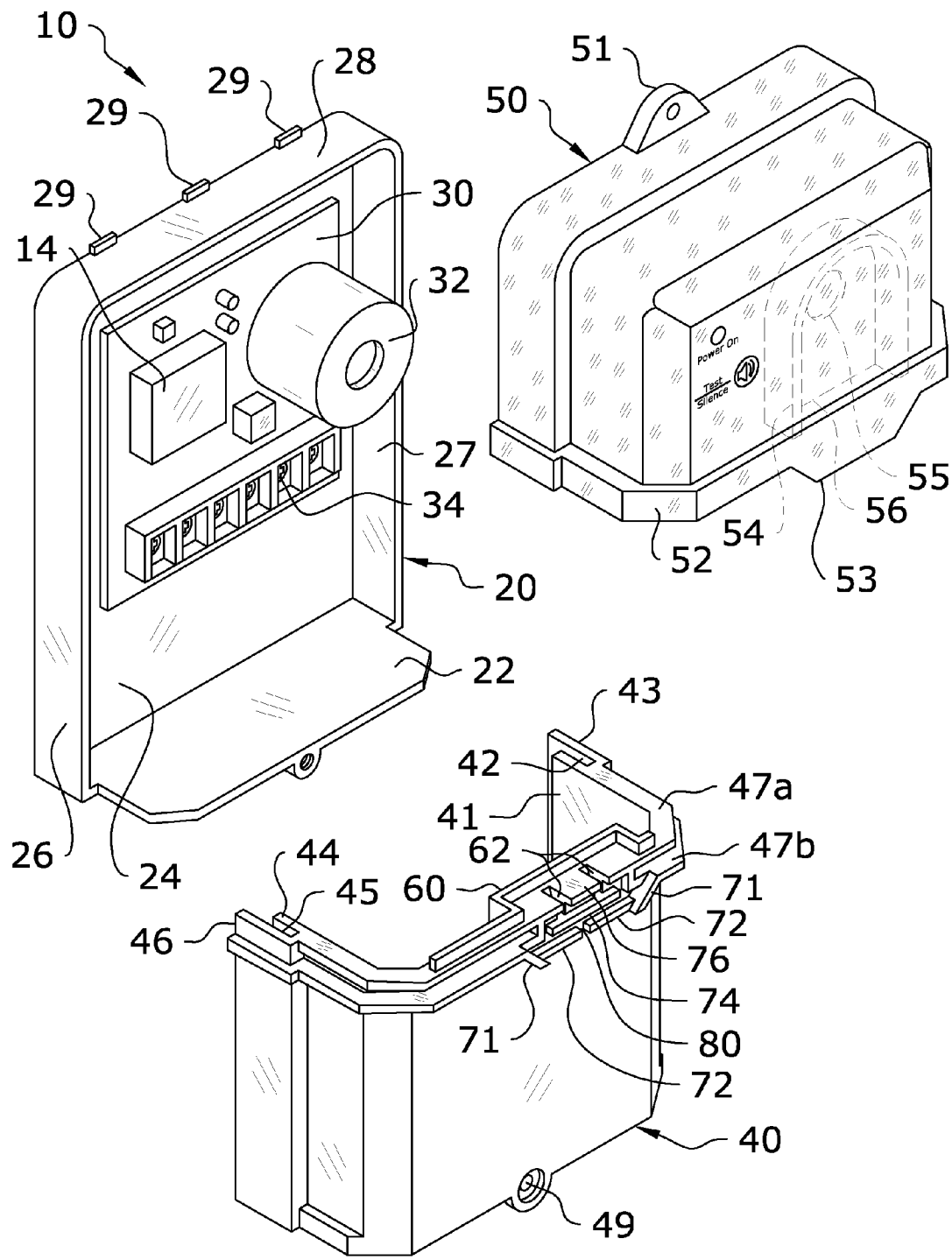
FIG. 7 is an exploded upper perspective view of the present invention.

As best illustrated in FIG. 7 of the drawings, the housing includes a base panel 20 and a cover removably connected to the base panel 20. The cover may be a single structure or multiple structures combined together as discussed further herein. The base panel 20 is utilized to secure the housing to a wall, pole or other structure suitable for providing audible and/or visual indication of a high or low water state as measured by a water level sensor.

Figure 3:
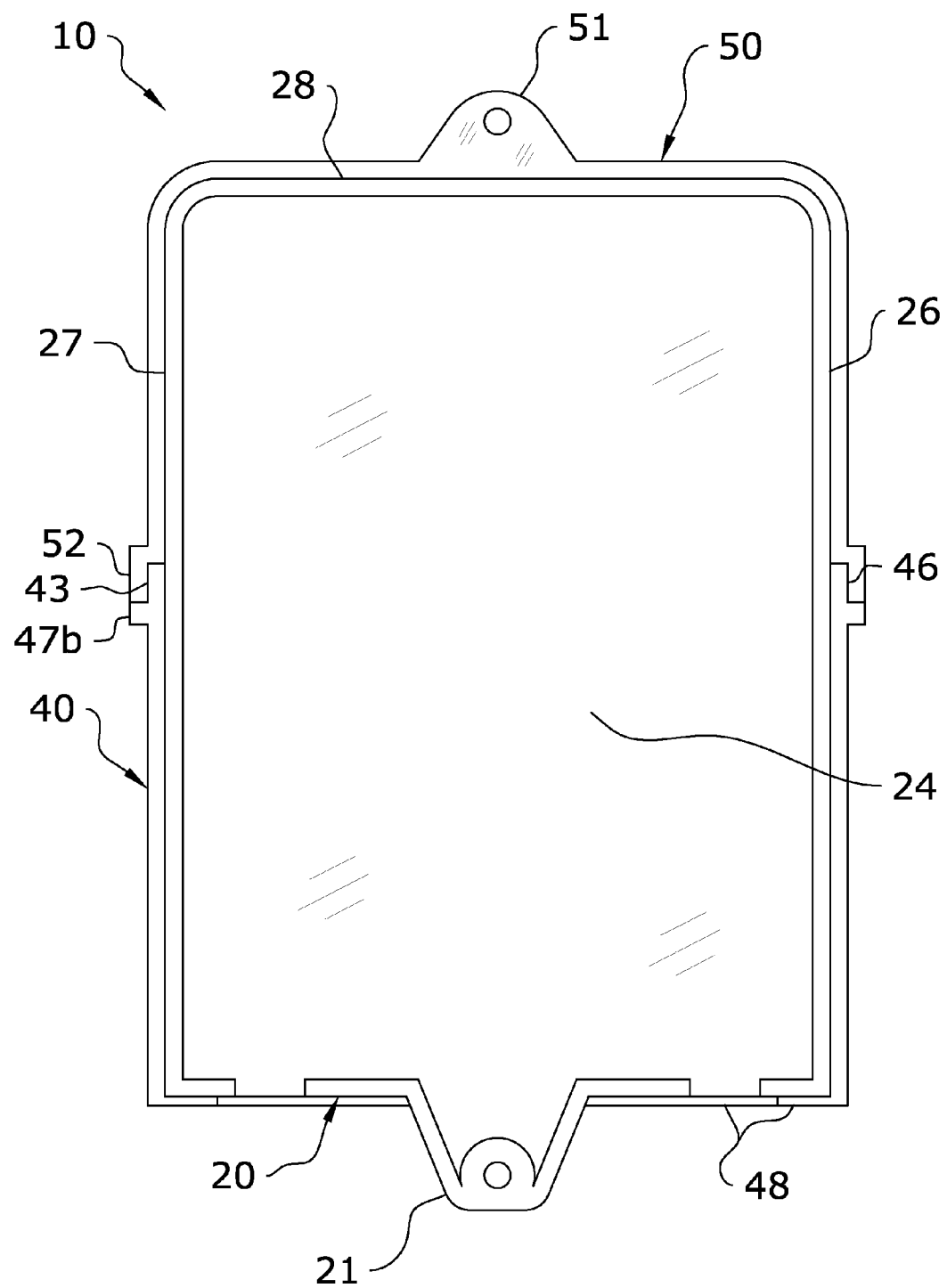
FIG. 3 is a rear view of the present invention.
Figure 4:
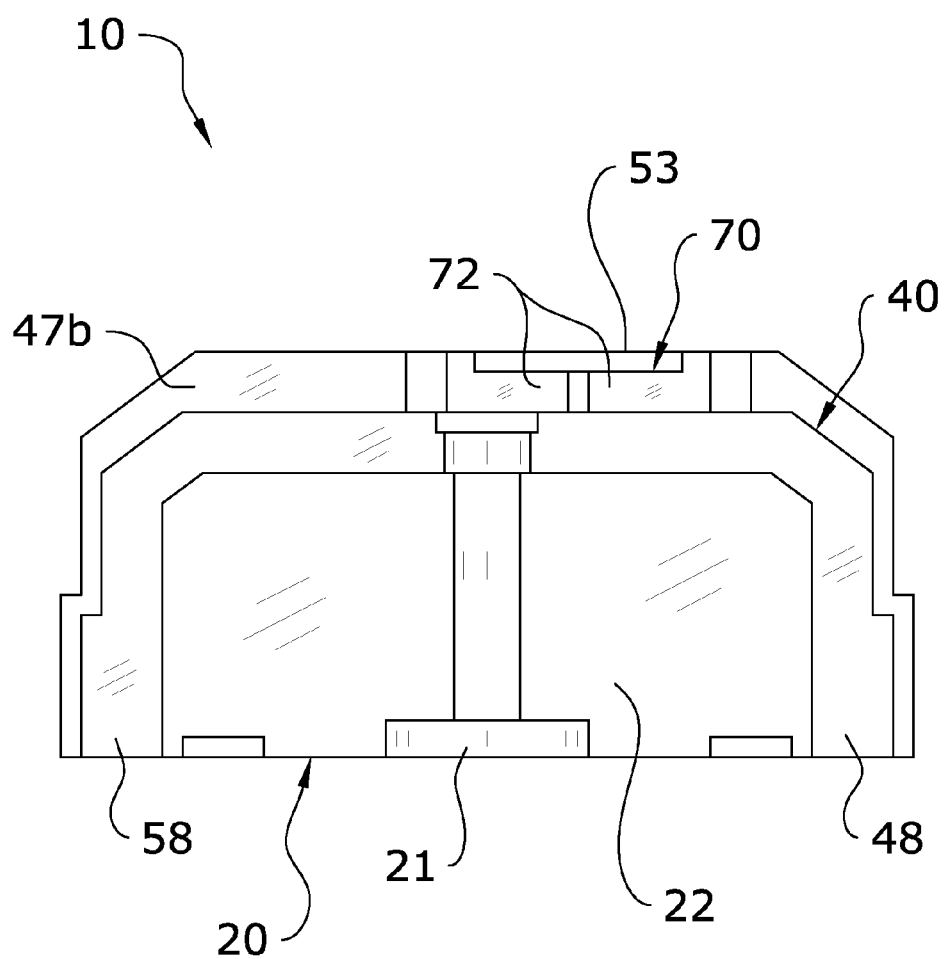
FIG. 4 is a bottom view of the present invention.
Figure 5:
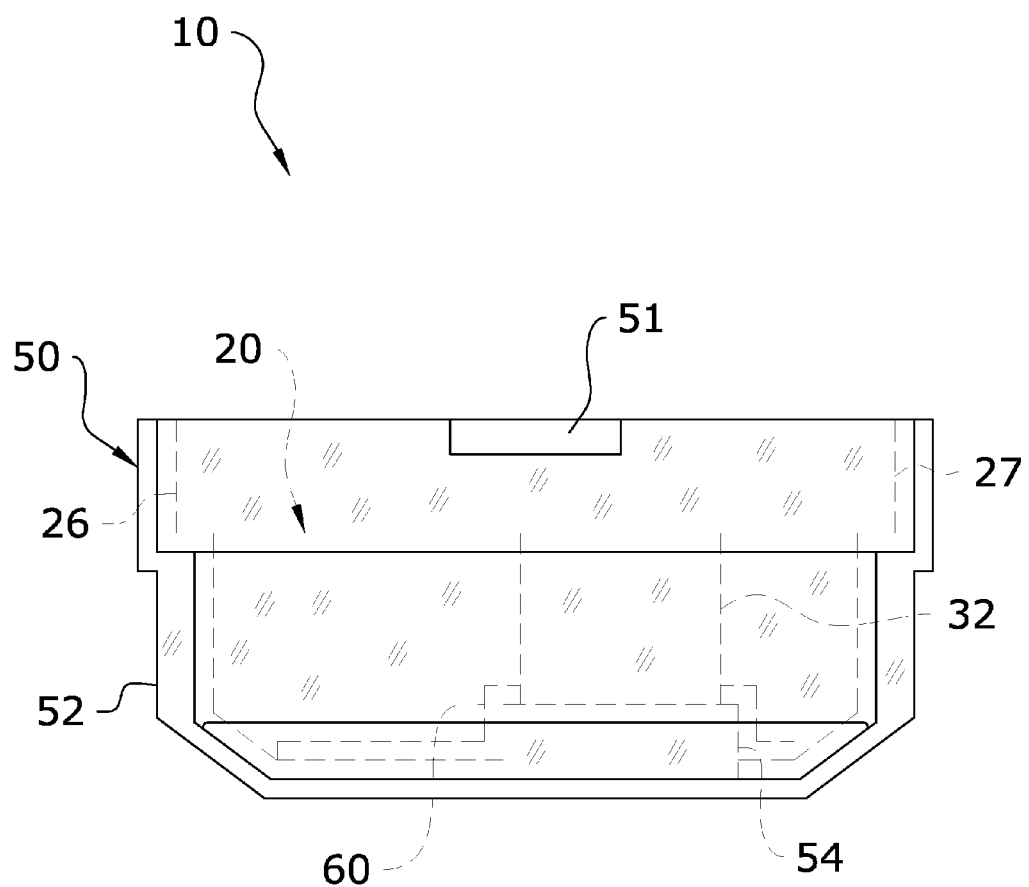
FIG. 5 is a top view of the present invention.

The base panel 20 includes a rear wall 24 that may be comprised of a flat and broad structure for securing electrical components to. The rear wall 24 is preferably comprised of a rectangular shape as best illustrated in FIG. 3 of the drawings. A lower extended member 21 with an aperture extends downwardly from the lower end of the base panel 20 to allow for securing to a structure with a conventional fastener (e.g. nail, screw, bolt). An upper extended member 51 with an aperture extends upwardly from the cover or the base panel 20 to allow for a fastener to extend through for securing to an object. One or more engaging members 29 extend upwardly from the rear panel to catchably engage an upper portion of the cover when secured.

As best shown in FIG. 7 of the drawings, a floor 22 extends outwardly from a lower end of the rear wall 24. The end user may drill holes within the floor 22 to allow for the passage of wires into the interior of the housing. The floor 22 preferably extends outwardly approximately the total depth of the housing. The floor 22 preferably extends orthogonally with respect to the rear wall 24. The floor 22 preferably includes a threaded aperture to receive a fastener that extends through a corresponding aperture within the cover to secure the cover to the base panel 20.

As further shown in FIG. 7, the base panel 20 further includes a first side flange 26 extending from a first side of the rear wall 24, a second side flange 27 extending from a second side of the rear wall 24 and an upper flange 28 extending from an upper edge of the base panel 20. The flanges 26, 27, 28 preferably extends outwardly from the rear wall 24 orthogonally forming an inverted U-shaped structure. The flanges 26, 27, 28 preferably have the same depth and the depth is preferably less than half the depth of the floor 22 to provide sufficient access to the electrical components within the housing when the cover is removed. The flanges 26, 27, 28 and the rear floor 22 are preferably connected extending from a perimeter of the rear panel as best illustrated in FIG. 7 of the drawings. The flanges 26, 27, 28 and the floor 22 are preferably connected to the rear panel without any openings.

The cover has a front portion with an inverted U-shaped flange extending toward the base panel 20. The cover is preferably open at the bottom thereof to receive the floor 22 of the base panel 20. The inverted U-shaped flange of the cover includes a first side channel 45 that receives the first side flange 26, a second side channel 42 that receives the second side flange 27 and an upper channel 57 that receives the upper flange 28. The overlapping of the cover over the flanges 26, 27, 28 prevents water from entering the interior of the housing without utilizing a seal. If water is able to pass between the cover and the base panel 20, the water is guided downwardly to the floor 22 wherein the water is allowed to drain without entering the interior of the housing.

As discussed, previously, the cover may be comprised of a single structure or multiple structures combined together. It is preferable that the cover is comprised of an upper cover 50 removably secured to an upper base portion of the base panel 20 and a lower cover 40 removably connected to a lower portion of the upper cover 50 and to a lower base portion of the base panel 20. The upper cover 50 includes indentations that catchably receive the engaging members 29 extending from the base panel 20 and then one or more fasteners secure the lower portion of the upper cover 50 to the base panel 20. The lower cover 40 removably fits beneath the upper cover 50 and above the floor 22. The lower cover 40 may be secured to the floor 22 with a conventional fastener.

The upper cover 50 includes a lower lip 52 that extends over an upper edge of the lower cover 40 when assembled. The lower lip 52 deflects water over the intersection of the upper end of the lower cover 40 and the lower end of the upper cover 50 to prevent the entry thereof. A first upper edge 47a of the lower cover 40 extends outwardly around the perimeter of upper end of the lower cover 40 and the lower lip 52 overlaps the first upper edge 47a. A second upper edge 47b is positioned beneath the first upper edge 47a, wherein the second upper edge extends outwardly further than the first upper edge 47b such that the lower end of the upper cover 50 rests upon the upper surface of the second upper edge 47b while simultaneously overlapping the first upper edge 47a. This configuration prevents the entry of water into the interior of the housing between the intersection of the upper cover 50 and the lower cover 40 (or through the sound vent 70 as discussed later).

Figure 2:
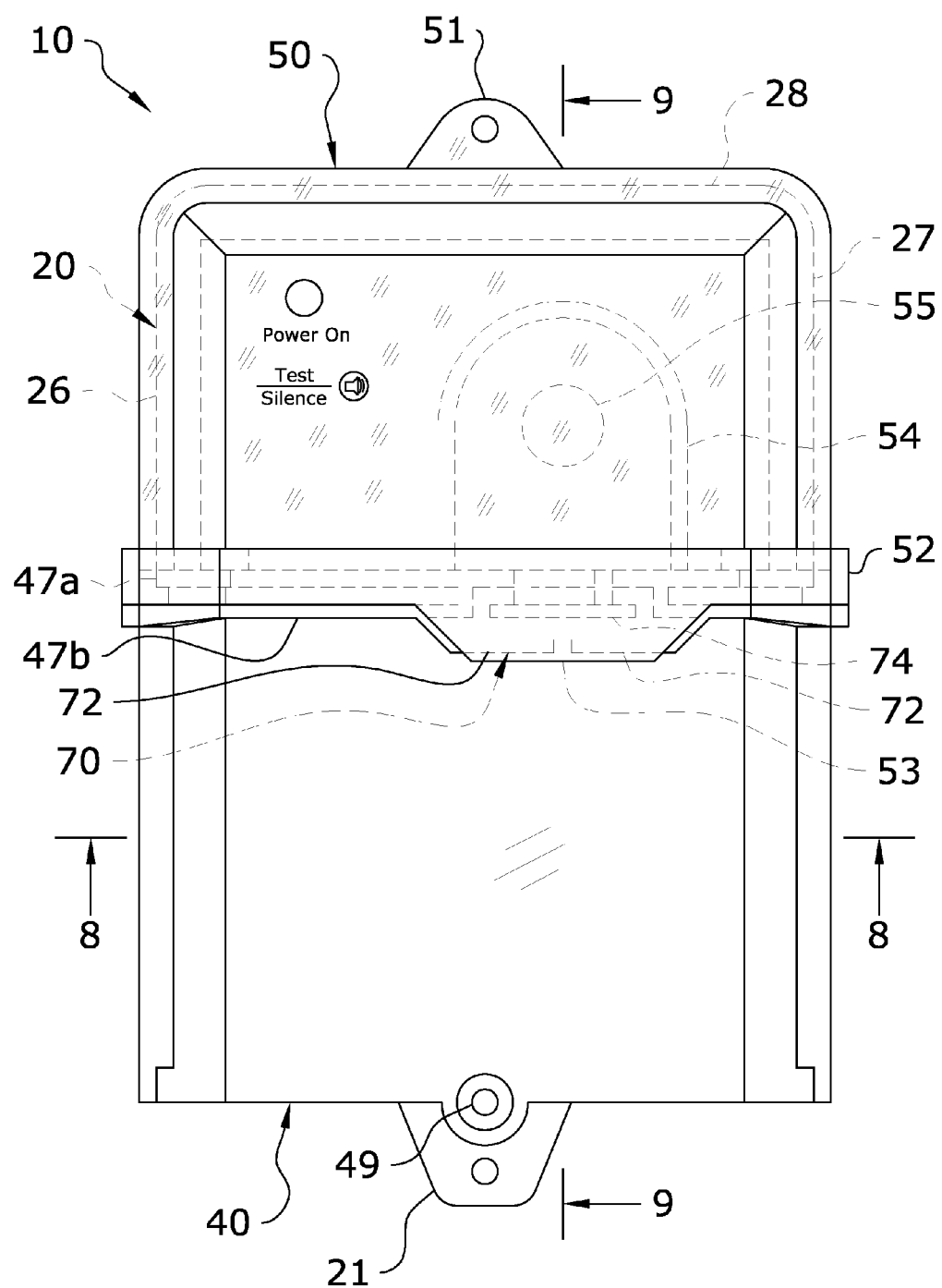
FIG. 2 is a front view of the present invention.
Figure 12:
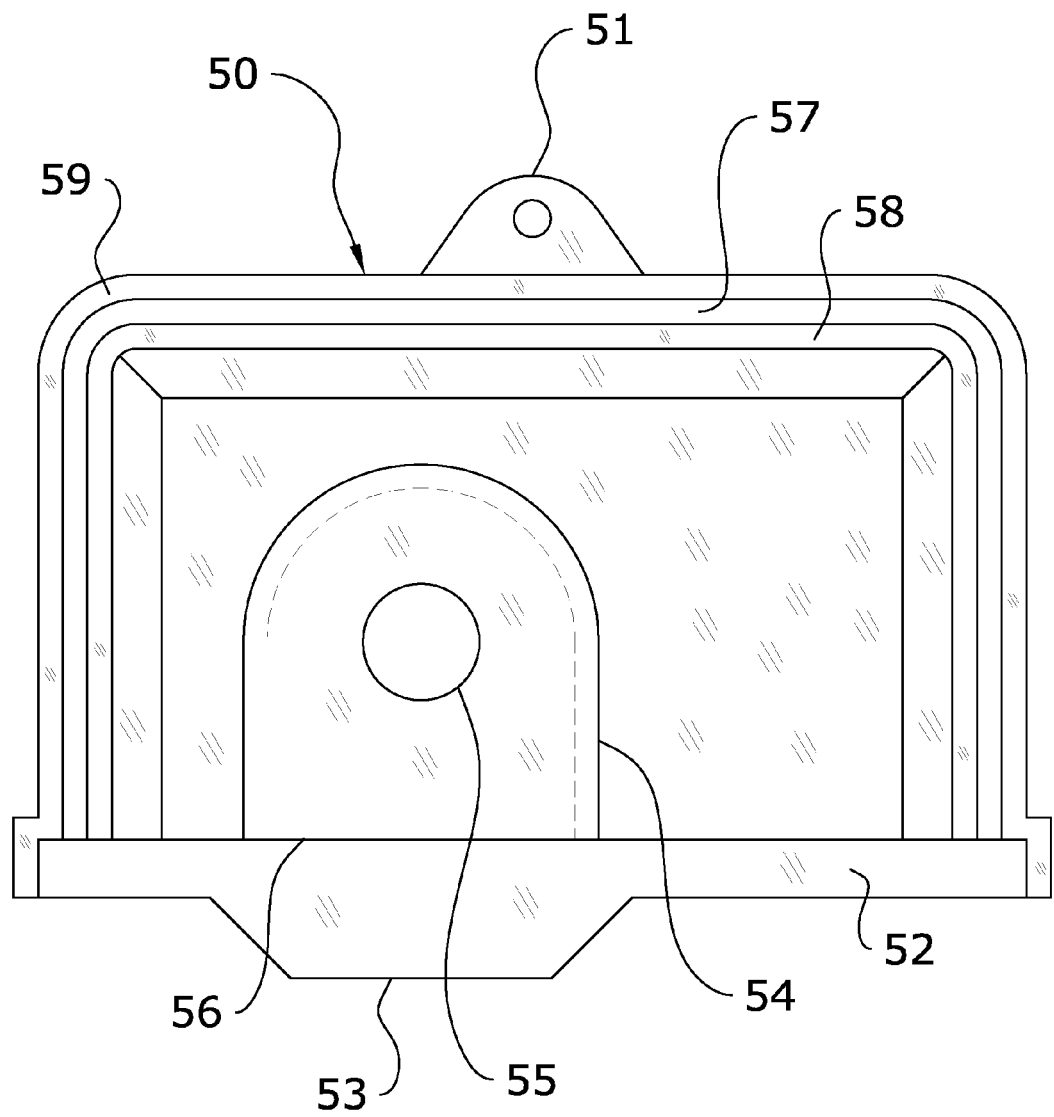
FIG. 12 is a rear view of the upper cover.

The upper cover 50 is preferably closed at the top, front and the sides as best illustrated in FIGS. 2 and 7 of the drawings. The upper cover 50 is comprised of a U-shaped cross sectional shape. The upper cover 50 further preferably includes an upper channel 57 that extends within a front edge of the upper cover 50 to receive the upper flange 28 and portions of the first side flange 26 and the second side flange 27. The upper channel 57 is an inverted U-shaped structure when viewed from the rear of the upper cover 50 as illustrated in FIG. 12 of the drawings. The upper channel 57 is preferably defined by an upper inner flange 58 and an upper outer flange 59 as further illustrated in FIG. 12 of the drawings. The upper cover 50 may be secured in a manner that is not easily removed to prevent easy access to some of the sensitive electrical components (e.g. control unit 14, speaker 32, light) whereas the lower cover 40 is preferably easily removed to provide convenient access to the connectors 34 and wires within.

Figure 9:
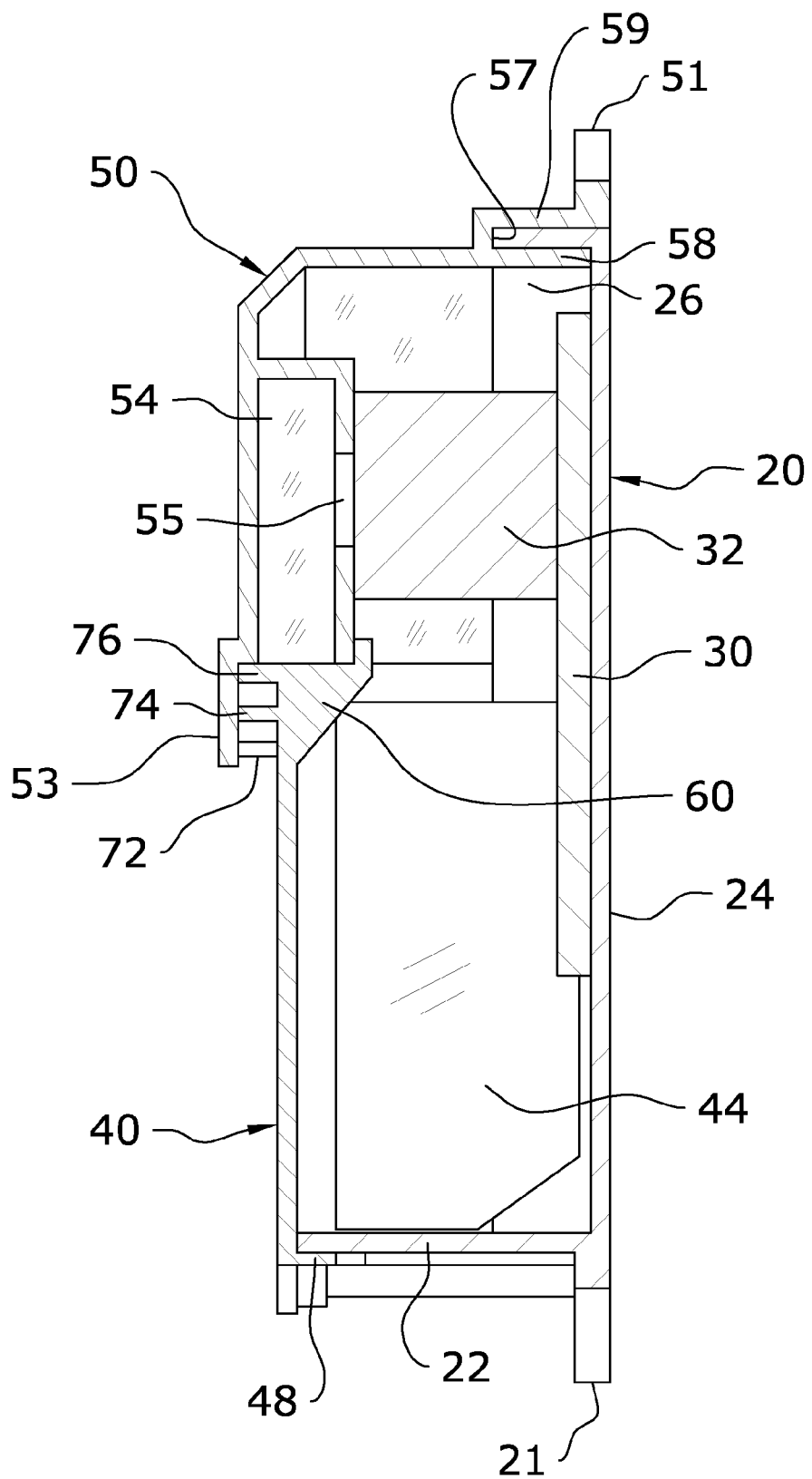
FIG. 9 is a cross sectional view taken along line 9-9 of FIG. 2.
Figure 11:
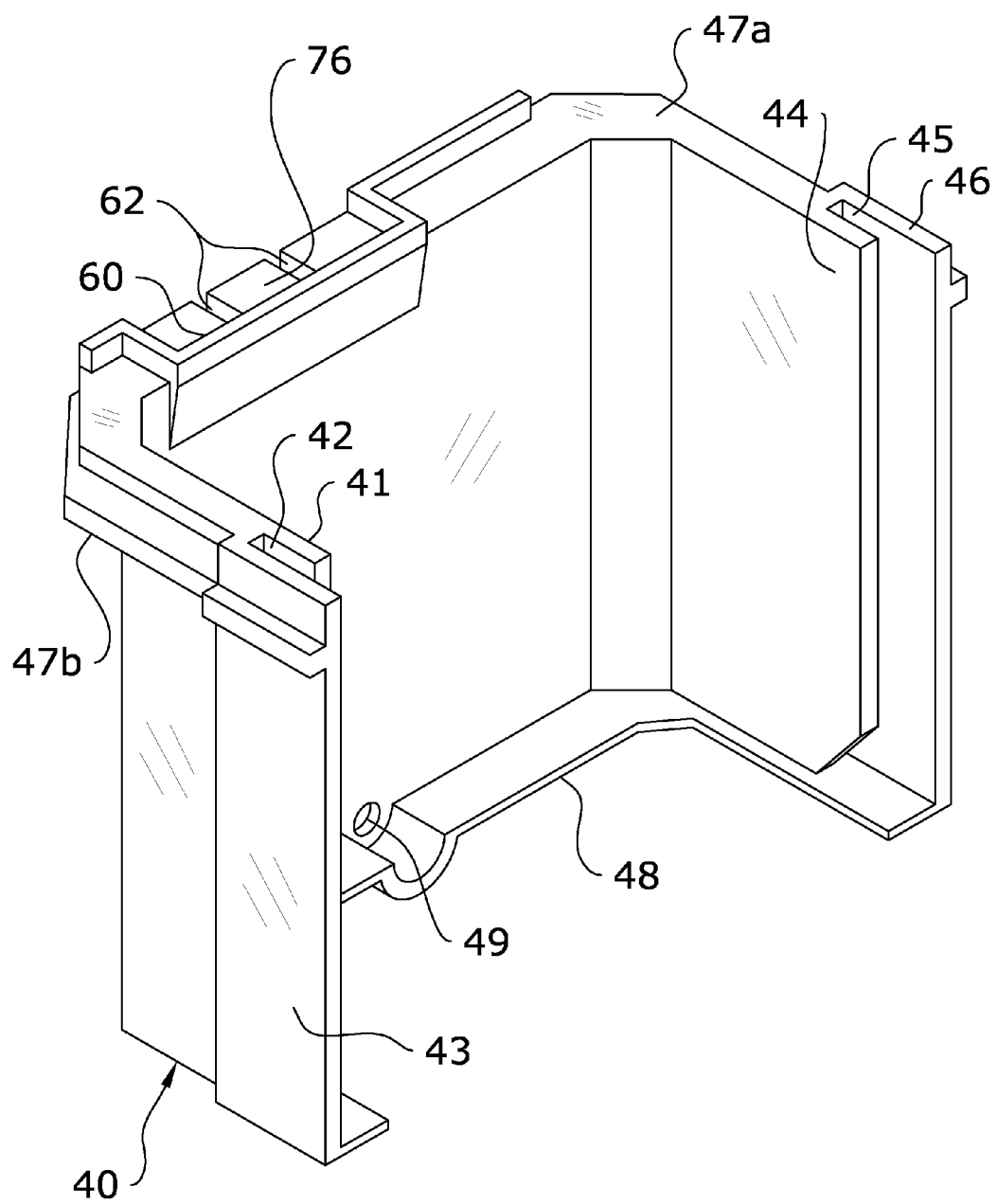
FIG. 11 is a rear upper perspective view of the lower cover.

The lower cover 40 has a U-shaped cross sectional shape and includes a lower flange 48 that extends beneath an edge portion of the floor 22 as best illustrated in FIGS. 9 and 11 of the drawings. The lower flange 48 preferably is slightly distally spaced from the bottom surface of the floor 22 of the base panel 20 to allow for the escape and release of water collected between the cover and base panel 20. A fastener aperture 49 further extends through the lower cover 40 to receive a conventional fastener for securing the lower cover 40 to the base panel 20.

The lower cover 40 further preferably includes a first inner flange 44 and a first outer flange 46 that define a first side channel 44 that receives the first side flange 26 of the base panel 20. The lower cover 40 further preferably includes a second inner flange 41 and a second outer flange 43 that define a second side channel 42 that receives the second side flange 27 of the base panel 20. The lower ends of the first inner flange 41 and the second inner flange 44 preferably rest upon the upper surface of the floor 22 when the lower cover 40 is assembled to retain the lower cover 40 adjacent to the upper cover 50 when assembled as further shown in FIG. 9 of the drawings. The inner lower portions of the first inner flange 41 and the second inner flange 44 are further preferably angled to assist in alignment and positioning of the lower cover 40 since opposing sides of the floor 22 only extend outwardly approximately the distance of the first side flange 26 and the second side flange 27. The outer flanges 43, 46 are positioned adjacent to the outer side edges of the floor 22 when assembled.

A light is positioned within the interior of the housing and preferably within the upper cover 50 of the housing. The upper cover 50 is preferably translucent thereby allowing light to pass through the upper cover 50 to provide a visual alarm when an undesirable water level is encountered. The upper cover 50 may have a color (e.g. red) to provide a colored light.

The upper cover 50 further preferably includes an indicator light to indicate if the power is on or off. The upper cover 50 may also include a test button to test the speaker 32 and/or light of the device.

C. Speaker.

The speaker 32 is positioned within the interior of the housing and may be comprised of any device capable of emitting sound such as a warning sound. Most speakers 32 utilized in alarm systems are comprised of piezoelectric speakers 32 to providing a repeating warning sound.

D. Control Unit.

The control unit 14 is within the housing and is electrically connected to the speaker 32 to control the operation of the speaker 32. The control unit 14 is preferably attached to the circuit board 30 that is mounted to the base panel 20. The control unit 14 is further in communication with a water level sensor or other sensor device to determine if the alarm (audible and/or light) should be activated by the control unit 14. Electrical power is provided to the control unit 14 via AC power source or a DC power source. The control unit 14 activates the speaker 32 to produce an alarm sound when the water level sensor detects a water level that is beyond a threshold level. Electrical connectors 34 are positioned upon the circuit board 30 to allow for the connection of wires (e.g. wires from a float switch) and power wires to the circuit board 30.

E. Sound Vent.

A sound vent 70 is positioned within the housing that allows sound generated from the speaker 32 to pass outwardly from the housing. The sound vent 70 includes a filter that allows the escape of sound from the interior housing while simultaneously preventing the entry of water into the interior of the housing. The sound vent 70 is preferably within the cover but can be positioned within the base panel 20 of the housing also. The sound vent 70 may be incorporated into either or both the upper cover 50 and the lower cover 40. The preferred embodiment discussed below illustrates the sound vent 70 incorporated into both the upper cover 50 and the lower cover 40 of the housing.

The sound vent 70 is preferably comprised of at least one baffle extending from the lower cover 40 defining at least one sound passage and an extended portion 53 extending downwardly from the upper cover 50 that covers the at least one sound passage. The extended portion 53 is preferably tapered inwardly as it extends downwardly and is adjacent to a pair of side portions 71 extending outwardly from the lower cover 40. The side portions 71 are angled inwardly toward one another as they extend downwardly to further guide any water that is able to get into the perimeter of the housing outwardly through the escape opening 80 of the sound vent 70. The escape opening 80 preferably faces downwardly to reduce the likelihood of water entering the escape opening 80. The escape opening 80 is positioned outwardly from the front vertical portion of the lower cover 40 as best illustrated in FIG. 8 of the drawings.

The at least one baffle is preferably comprised of at least one lower baffle 72 and at least one upper baffle 76 positioned above the lower baffle 72 as illustrated in FIG. 7 of the drawings. The at least one baffle is further preferably comprised of at least one middle baffle positioned between the at least one lower baffle 72 and the at least one upper baffle 76 as further shown in FIG. 7 of the drawings. The escape opening 80 is preferably within the lower baffle 72 or between the lower baffles 72. The center baffle 74 is preferably horizontal and the escape opening 80 is preferably aligned with a central portion of the center baffle 74 to prevent a direct path for the sound passage. The lower baffles 72 and the upper baffles 76 are also preferably horizontally aligned and are preferably parallel with respect to the center baffle 74. The center baffle 74 splits the sound passage into two sound passages that must go around the center baffle 74 as illustrated in FIGS. 7 and 10 of the drawings.

One or more first passages 62 extend within the first upper edge 47*a* of the lower cover 40 and are fluidly connected to the at least one sound passage within the sound vent 70. The first passages 62 allow for the sound from the speaker 32 to enter the sound vent 70 and then to pass through the sound passage out through the escape opening 80. An upper member 60 extends upwardly from the upper edge behind the first passages 62 to provide an additional barrier of protection from water entering the interior of the housing.

Figure 8:
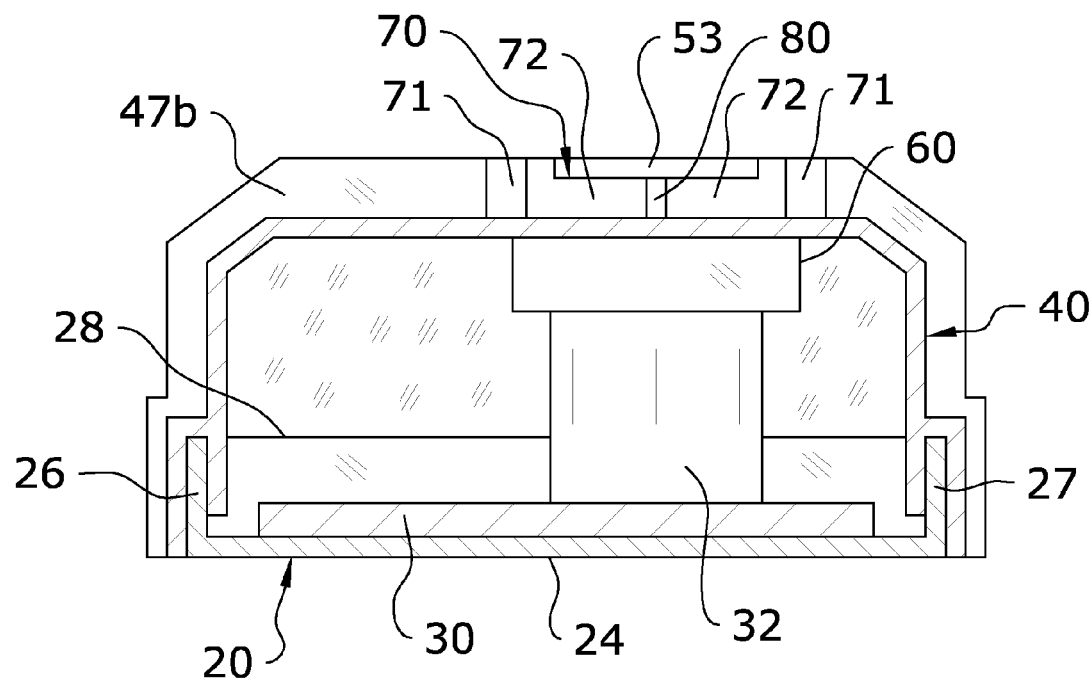
FIG. 8 is a cross sectional view taken along line 8-8 of FIG. 2.
Figure 10:
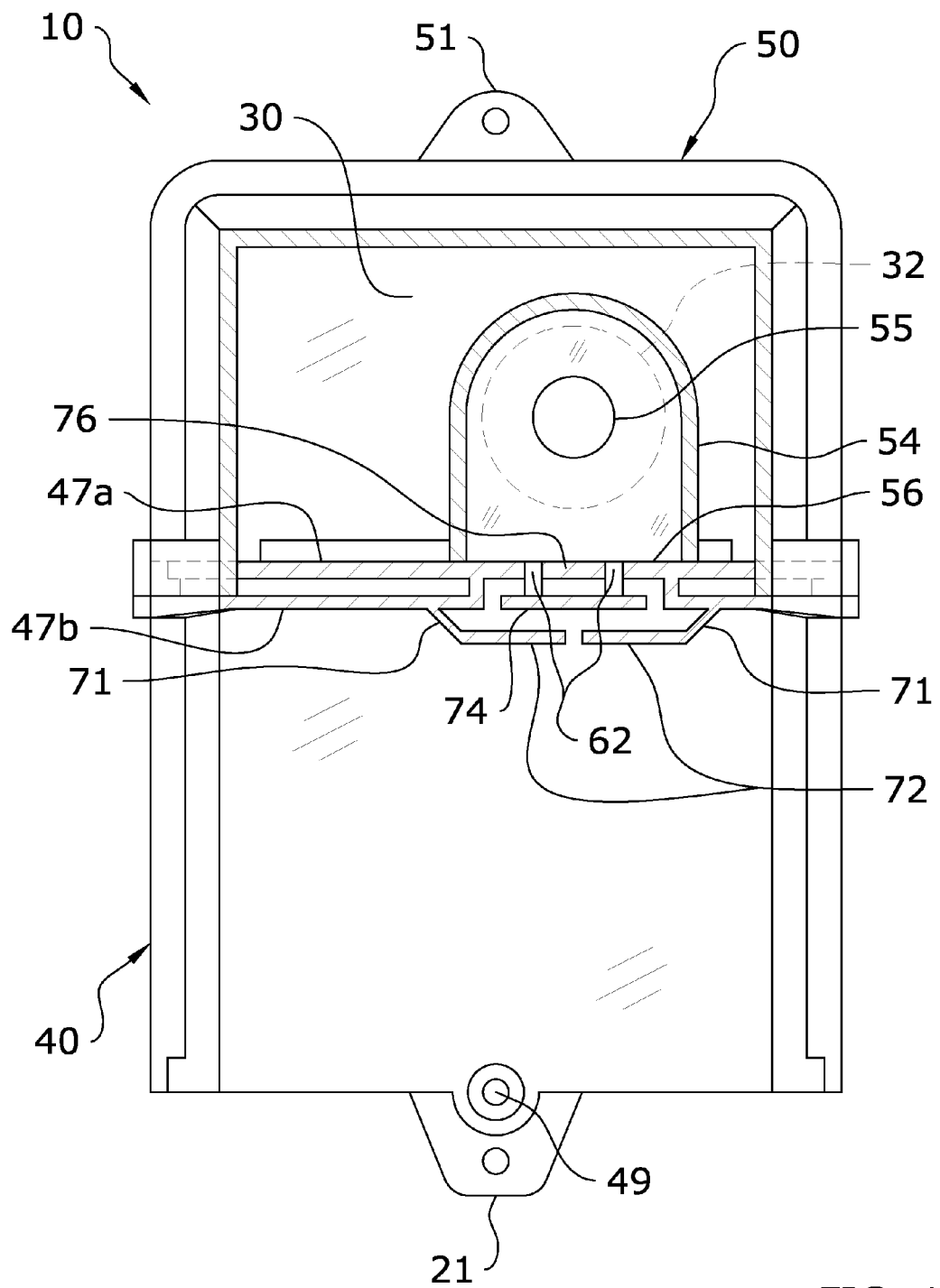
FIG. 10 is a cross sectional view taken along line 10-10 of FIG. 6b.

A sound guide 54 is preferably attached to an inner surface of the upper cover 50 as best illustrated in FIGS. 8, 10 and 12 of the drawings. The sound guide 54 forms a chamber and has a lower opening 56 that fluidly connects to the first passages 62 of the sound vent 70. A sound aperture 55 extend into the sound guide 54 that receives sound from the speaker 32. The sound aperture 55 is aligned with and adjacent to the speaker 32 to receive a significant portion of the sound emitted by the speaker 32 and to direct the same to the sound vent 70.

F. Operation of Preferred Embodiment.

Figure 6A:
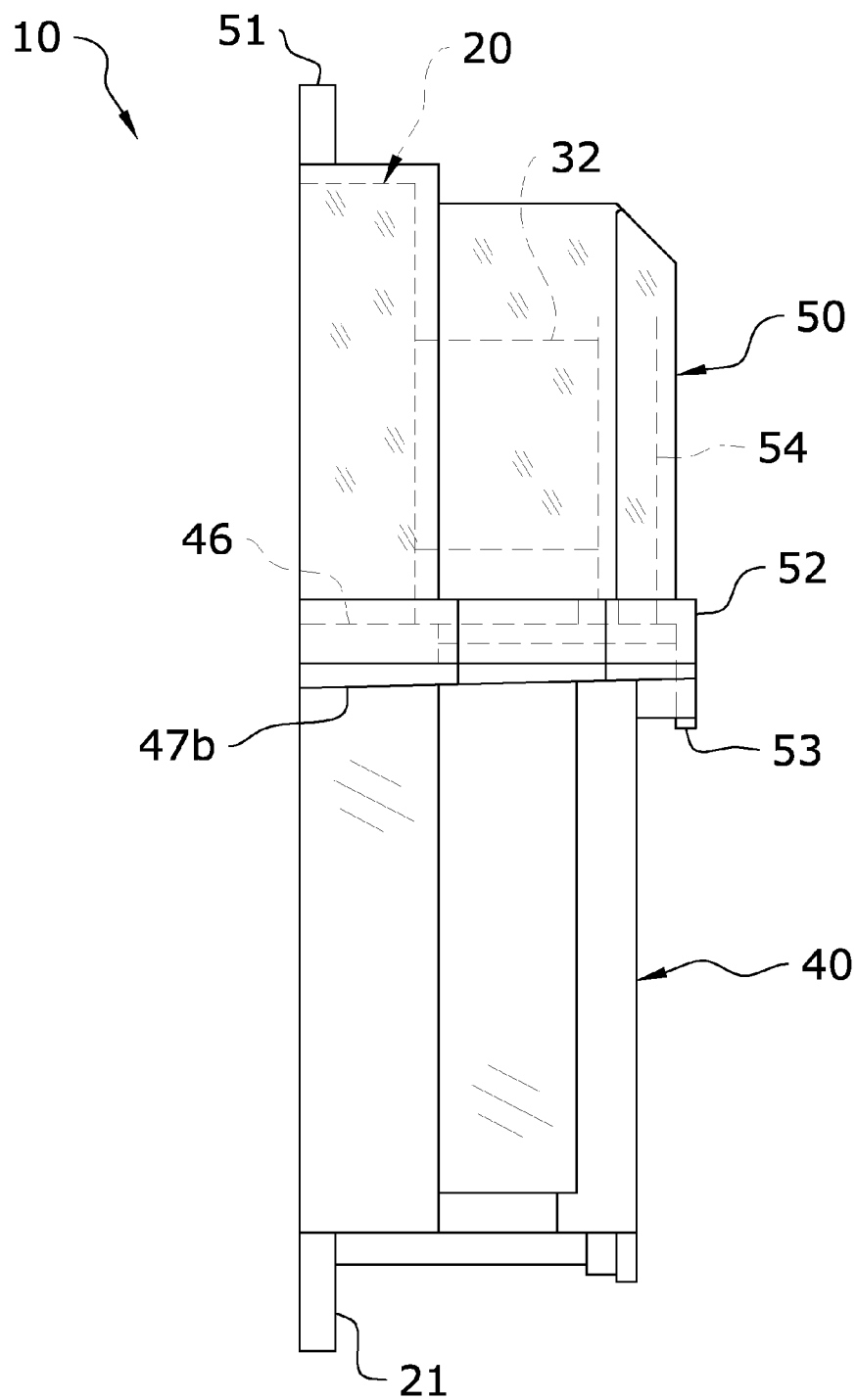
FIG. 6a is a left side view of the present invention.
Figure 6B:
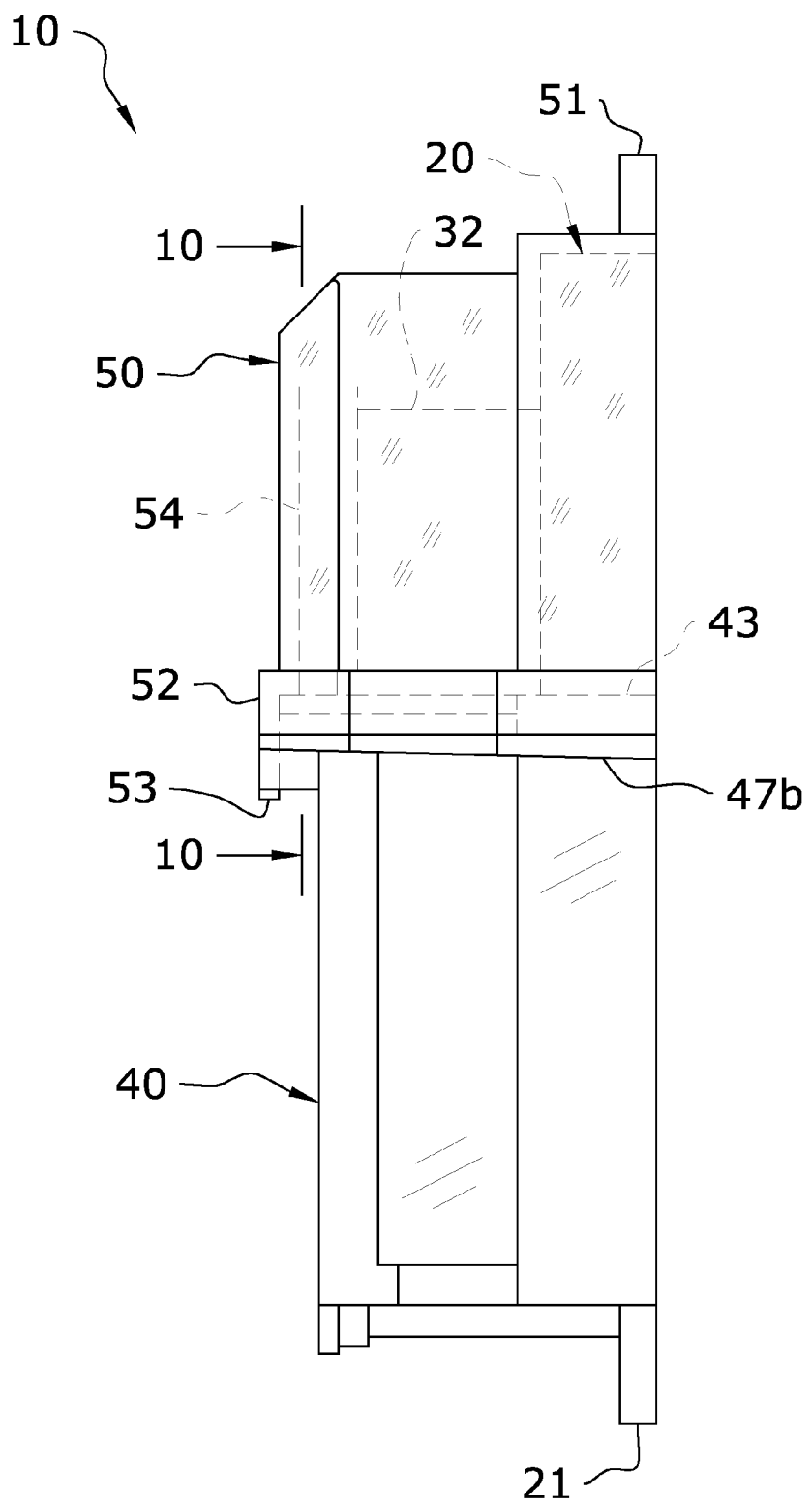
FIG. 6b is a right side view of the present invention.
Figure 6C:
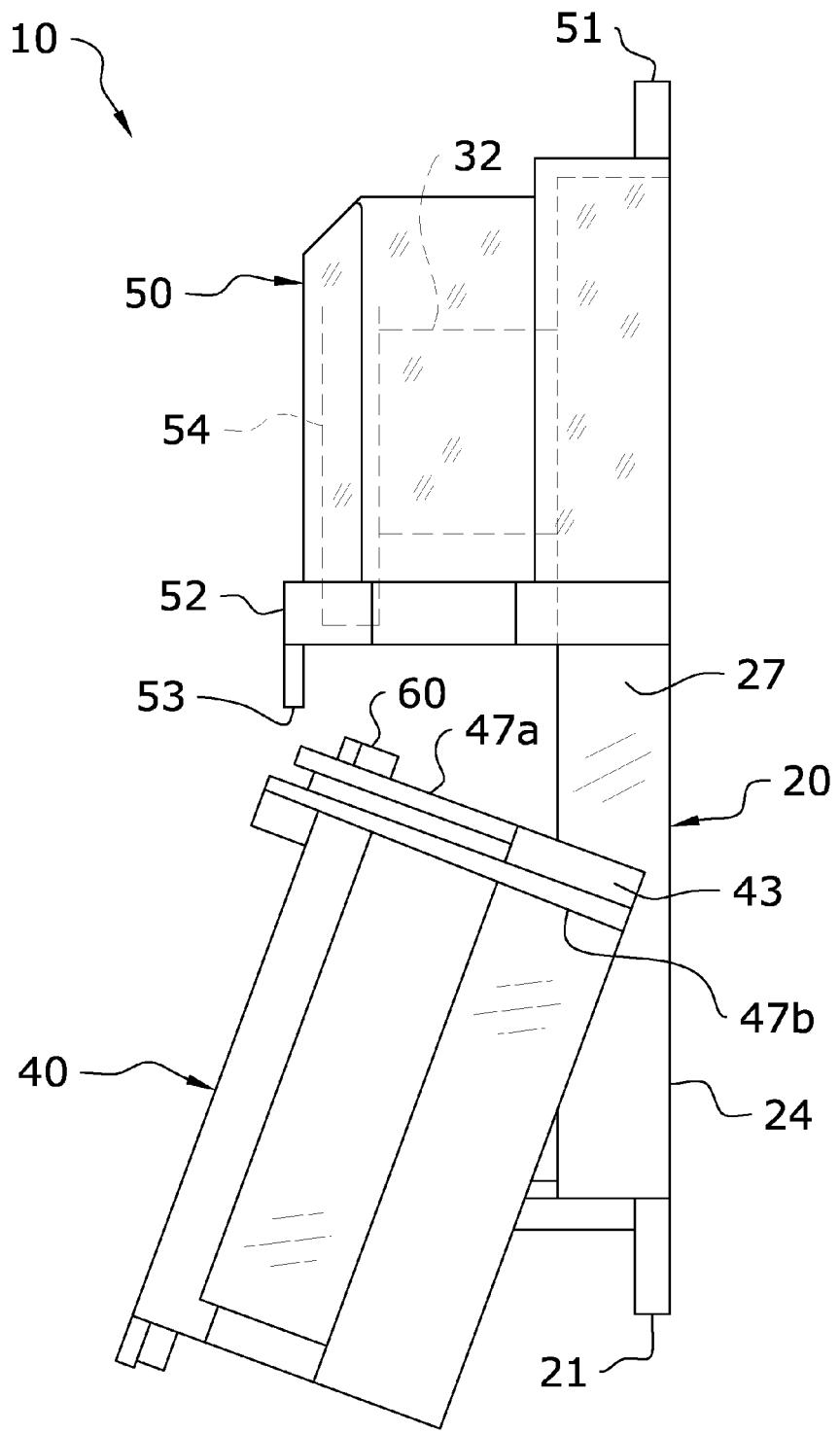
FIG. 6c is a right side view of the present invention with the lower cover partially removed.

In use, the user creates openings within the floor 22 of the base panel 20 to extend wires through. The user then secures the base panel 20 to an object such as a wall or post with conventional fasteners. The upper cover 50 may be secured to the base panel 20 prior to the securing of the base panel 20 to the object. After securing the base panel 20, the user then electrically connects the wires to the connectors 34 as with a conventional alarm system. The user then positions the lower cover 40 beneath the upper cover 50 and facing the base panel 20 with the upper end of the lower cover 40 near the lower end of the upper cover 50 as illustrated in FIG. 6*c* of the drawings. The user inserts the upper end of the lower cover 40 within the lower end of the upper cover 50 and simultaneously pivots the lower end toward the base panel 20 until the lower cover 40 is completely attached upon the base panel 20. When an alarm situation occurs, sound from the speaker 32 is emitted through the sound vent 70 to warn individuals of a possible high or low water situation. If water (e.g. rain) engages the outer surface of the housing, the water is deflected away and does not enter the interior of the housing. If some water enters between the connections of the base panel 20, upper cover 50 and/or lower cover 40, the water is directed downwardly out either the bottom end of the lower cover 40 or out through the escape opening 80. Water that enters the escape opening 80 of the sound vent 70 is prevented from entering the interior of housing by the baffles 72, 74, 76 within the sound vent 70 which require the water to pass upwardly through the sound passage(s) within the sound vent 70 which is difficult since the sound passage is not a straight passage. The water eventually is pulled downwardly by gravity outwardly through the escape opening 80 thereby keeping the interior of the housing dry. Any water that does enter the interior of the housing is able to pass downwardly along the interior surfaces of the housing and escape out through the space between the floor 22 and the lower flange 48 of the lower cover 40.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An alarm system, comprising:
   a housing having an interior;
   a speaker within said interior of said housing; and
   a sound vent within said housing that allows sound generated from said speaker to pass outwardly from said housing, wherein said sound vent prevents the entry of water into said interior of said housing;
   wherein said sound vent includes an escape opening, a first passage and a sound passage fluidly connected between the escape opening and the first passage;
   wherein said first passage is adapted to allow sound from said speaker to enter said sound passage, wherein said sound is allowed to escape said housing via said escape opening;
   wherein said sound passage prevents a direct path for said sound between said first passage and said escape opening.

2. The alarm system of claim 1, wherein said housing is comprised of a base panel and a cover removably connected to said base panel.

3. The alarm system of claim 2, wherein said housing does not include a seal.

4. The alarm system of claim 3, wherein said housing is water resistant.

5. The alarm system of claim 2, wherein said cover is comprised of an upper cover secured to an upper base portion of said base panel and a lower cover removably connected to a lower portion of said upper cover and to a lower base portion of said base panel.

6. The alarm system of claim 5, wherein said upper cover includes a lower lip that extends over an upper edge of said lower cover.

7. The alarm system of claim 5, wherein said speaker is positioned within said upper cover.

8. The alarm system of claim 5, wherein said sound vent is comprised of at least one baffle extending from said lower cover defining at least one sound passage and an extended portion extending downwardly from said upper cover that covers said at least one sound passage.

9. The alarm system of claim 8, wherein said at least one baffle is comprised of at least one lower baffle and at least one upper baffle.

10. The alarm system of claim 9, wherein said at least one baffle is comprised of at least one middle baffle positioned between said at least one lower baffle and said at least one upper baffle.

11. The alarm system of claim 10, including a plurality of first passages within an upper edge of said lower cover and fluidly connected to said at least one sound passage.

12. The alarm system of claim 11, including an upper member extending upwardly from said upper edge behind said first passages.

13. The alarm system of claim 5, including a light positioned within said housing and wherein said upper cover is comprised of a translucent material.

14. The alarm system of claim 2, wherein said base panel includes a rear wall, a floor extending from a lower end of said rear wall, a first side flange extending from a first side of said rear wall, a second side flange extending from a second side of said rear wall, wherein said floor extends outwardly further than said first side flange and said second side flange, and an upper flange extending from an upper edge of said base panel, wherein said cover includes a first side channel that receives said first side flange, a second side channel that receives said second side flange and a top channel that receives said upper flange.

15. The alarm system of claim 1, wherein said escape opening faces downwardly.

16. The alarm system of claim 15, wherein said cover includes a front vertical portion, wherein said escape opening is positioned outwardly from said vertical portion.

17. The alarm system of claim 15, including a sound guide attached to an inner surface of said cover, wherein said sound guide has a lower opening that fluidly connects to said sound vent and a sound aperture that receives sound from said speaker.

18. The alarm system of claim 17, wherein said sound aperture is aligned with and adjacent to said speaker.

19. The alarm system of claim 1, including a control unit within said housing that is electrically connected to said speaker to control said speaker, wherein said control unit is in communication with a water level sensor.

20. The alarm system of claim 19, wherein said control unit activates said speaker to produce an alarm sound when said water level sensor detects a water level that is beyond a threshold level.

21. The alarm system of claim 1, wherein said sound vent includes at least one baffle.

22. The alarm system of claim 21, wherein said at least one baffle includes a center baffle to prevent a direct path for said sound between said first passage and said escape opening.

23. The alarm system of claim 22, wherein said center baffle is positioned within said sound passage and separates said sound passage into at least a first sound passage and a second sound passage.

24. An alarm system, comprising:
   a housing having an interior;
   a speaker within said interior of said housing; and
   a sound vent within said housing that allows sound generated from said speaker to pass outwardly from said housing, wherein said sound vent prevents the entry of water into said interior of said housing;
   wherein said housing is comprised of a base panel and a cover removably connected to said base panel;
   wherein said cover is comprised of an upper cover secured to an upper base portion of said base panel and a lower cover removably connected to a lower portion of said upper cover and to a lower base portion of said base panel.

25. The alarm system of claim 24, wherein said upper cover includes a lower lip that extends over an upper edge of said lower cover.

26. An alarm system, comprising:
- a housing having an interior;
- a speaker within said interior of said housing; and
- a sound vent within said housing that allows sound generated from said speaker to pass outwardly from said housing, wherein said sound vent prevents the entry of water into said interior of said housing;
- wherein said sound vent has an escape opening facing downwardly;
- wherein said cover includes a front vertical portion, wherein said escape opening is positioned outwardly from said vertical portion.

27. The alarm system of claim 26, including a sound guide attached to an inner surface of said cover, wherein said sound guide has a lower opening that fluidly connects to said sound vent and a sound aperture that receives sound from said speaker.

28. The alarm system of claim 27, wherein said sound aperture is aligned with and adjacent to said speaker.

29. The alarm system of claim 26, wherein said sound vent includes at least one baffle.

30. The alarm system of claim 29, wherein said at least one baffle includes a center baffle to prevent a direct path for said sound between said first passage and said escape opening.

31. The alarm system of claim 30, wherein said center baffle is positioned within said sound passage and separates said sound passage into at least a first sound passage and a second sound passage.

\* \* \* \* \*